United States Patent [19]

Minami

[11] Patent Number: 5,795,550
[45] Date of Patent: Aug. 18, 1998

[54] APPARATUS FOR PACKING CATALYST

[75] Inventor: Yoshitaka Minami, Himeji, Japan

[73] Assignee: Idemitsu Engineering Co., Ltd., Tokyo, Japan

[21] Appl. No.: 598,911

[22] Filed: Feb. 9, 1996

Related U.S. Application Data

[62] Division of Ser. No. 297,115, Aug. 26, 1994, abandoned.

[30] Foreign Application Priority Data

Aug. 27, 1993  [JP]  Japan ..................... 5-212794
Aug. 27, 1993  [JP]  Japan ..................... 5-212795
Aug. 27, 1993  [JP]  Japan ..................... 5-212797

[51] Int. Cl.$^6$ ..................................... B01J 8/08
[52] U.S. Cl. .................. 422/219; 422/107; 422/108; 422/232; 414/301
[58] Field of Search ............... 422/213, 232, 422/216, 107, 219, 108; 502/523; 414/301; 141/1, 286

[56] References Cited

U.S. PATENT DOCUMENTS 5,296,202  3/1994  Souers et al. .................. 422/219

FOREIGN PATENT DOCUMENTS

122807  4/1989  Japan.
644987  7/1994  Japan.

*Primary Examiner*—Hien Tran
*Attorney, Agent, or Firm*—Flynn, Thiel, Boutell & Tanis, P.C.

[57] ABSTRACT

A catalyst packing apparatus with which a desired packed density can be easily and surely obtained by use of a suspended type catalyst ejector, wherein correlated data giving a scattering height from which a desired packed density can be obtained has been determined and stored beforehand in a memory part 74, and by setting a desired packed density, prior to the scattering of catalyst, a selecting part 75 selects a scattering height corresponding to the desired packed density from the correlated data in the memory part 74 and delivers the same to an adjusting part 76 which controls the catalyst ejector 30 so as to obtain this scattering height, thereby the catalyst 11 in a reaction tower 10 can be packed at the desired packed density.

11 Claims, 5 Drawing Sheets

APPARATUS FOR PACKING CATALYST

This is a division of Ser. No. 08/297,115, filed Aug. 26, 1994, now abandoned.

BACKGROUND OF THE INVENTION

1. Field of the Invention

The present invention relates to an apparatus for packing catalyst, which can be used in a work for packing particulate catalyst in a reaction tower used in a petrochemical plant or the like, and so forth.

2. Description of the Related Art

A reaction tower in a petroleum refining plant, petrochemical plant or the like is packed therein with suitable catalyst as necessary in order to use the same for accelerating the reaction by a reaction solution. Particulate catalyst has been normally used in order to enhance the ability of contact with the reaction solution, and has been packed in the reaction tower at a predetermined density.

In a conventional catalyst packing work or the like, a worker in a reaction tower suitably manipulates a hose through which catalyst is fed from an external hopper and which is led through an opening formed in the upper part of the reaction tower, so as to scatter the catalyst, and then he levels the surface of the catalyst in the tower.

However, with this conventional catalyst packing method, the following disadvantages have been offered. That is, since the worker carries out the work with his labor in the reaction tower, the efficiency of working is low, and since the worker treads the catalyst in the reaction tower, the packing density becomes nonuniform.

In order to eliminate the above-mentioned disadvantages, the applicant proposed a catalyst packing method in which a rotary scatter type catalyst ejector is used (refer to Japanese Laid-Open Patent No. 1-22807).

In this packing method, the rotary scatter type ejector for rotationally scattering catalyst from a rotary ejection plate in the lower part thereof is suspended down from the top opening of a reaction tower, and the suspended height of the catalyst ejector, the rotational speed of the ejection plate and the like are controlled so as to scatter the catalyst in a multi-cylinder-like form from the center to the outer periphery of the reaction tower, thereby it is possible to easily ensure a suitable and uniform scattering density and a uniform surface level of the catalyst.

It is noted that the packing density of the catalyst bed is exhibited by weight/volume of packed catalyst, and as the packed condition, a maximum packed condition in which the catalyst is laterally aligned in the reaction tower so as to give a maximum density, and a sock packed condition in which the catalyst entangles with one another in the reaction tower so as to have a low density, are used.

These conditions as well as the value of density are suitably selected in accordance with a kind of catalyst, a configuration of a catalyst tower to be packed with the catalyst, a property of reaction solution and the like.

By the way, in the above-mentioned rotary scatter packing method, the height of the catalyst ejector from the surface of the catalyst bed during scattering is controlled so as to be substantially constant, and so forth, in order to aim at uniformizing the density of packed catalyst bed having been scattered.

However, the density of the packed catalyst bed is determined in dependence upon various terms such as a kind, particle size and specific weight of the catalyst, a volume of scatter per hour of the same, a rotational speed of the catalyst ejector, a height of scattered catalyst bed and the like. Thus, these various condition have to be appropriately set in order to obtain a desired packed density although the uniformization of the density can be made by constantly maintaining the various terms, i.e. the kind, particle size, the volume of scatter, rotational speed of the catalyst ejector, etc.

Such an appropriate setting requires experiences owned by a skilled person, repetitions of trials each time when a packing work is carried out, and the like, thereby it is difficult to surely and easily obtain a desired packed density of catalyst bed.

A first object of the present invention is to provide a method of and an apparatus for packing catalyst with which a desired packed density of catalyst bed can be obtained by using a suspended type catalyst ejector for scattering the catalyst in a reaction tower.

A second object of the present invention is to provide a method of and an apparatus for packing catalyst which can eliminate disadvantages such as the complicated work of adjusting the length of a hose used for feeding the catalyst into a suspended type catalyst ejector which is inherent to conventional packing work, the slack in the hose or the like during pay-off or wind-up of the hose so as to facilitate the packing work.

A third object of the present invention is to provide a method of inspecting the configuration of the outer surface of catalyst bed packed in a reaction tower, with which the configuration of the outer surface can be surely inspected from the outside without the worker entering the reaction tower in order to visually check the configuration of the surface of the catalyst bed or without the provision of camera or the like for monitoring the inside of the reaction tower, and which can simplify the apparatus and can enhance the working efficiency.

SUMMARY OF THE INVENTION

To achieve the above ends, according to the present invention, there is provided a method of packing catalyst in a reaction tower by scattering the catalyst from a catalyst ejector suspended in the reaction tower, characterized by the steps of:

beforehand determining a relationship between a scattering height from the outer surface of the catalyst bed in the reaction tower to the catalyst ejector and a packed density of the catalyst bed packed up to the height; and selecting a scattering height corresponding to a desired packed density in view of the relationship during scattering of the catalyst; and adjusting the height of the catalyst ejector so as to obtain said thus selected scattering height.

Further, according to the present invention there is provided a catalyst packing apparatus having a catalyst ejector suspended in a reaction reactor which can scatter the catalyst in the reaction tower and which is adjustable in its suspended height, and a control means for controlling the height of the catalyst ejector, characterized in that the control means has a memory part for storing therein a relationship between a scattering height measured from the outer surface of the catalyst bed in the reaction tower to the catalyst ejector and a packed density of the catalyst bed, a selecting part for selecting a scattering height corresponding to a designated packed density from the memory part, and an adjusting part for adjusting the height of the catalyst ejector so as to obtain the scattering height selected by the selecting part.

It is noted that the relationship to the scattering height, from which a desired packed density can be obtained, can be obtained beforehand by using actual measurements under various conditions, accumulation of empirical data given by skilled persons, and those obtained by generalizing these data and the like.

With these arrangements, since the relationship to the scattering height from which a desired packed density is obtained has previously been determined, a desired scattering height corresponding to the desired packed density is selected from the relationship in order to control the catalyst ejector, thereby it is possible to attain the desired packed density as the result of the scattering.

In this case, it is sufficient for controlling the catalyst ejector to select the corresponding height in reference to the relationship which has been beforehand determined, so as to control it in order to always obtain the selected scattering height. Accordingly, it is possible to eliminate the necessity of empirically setting by a skilled person, the repetitions of trails or the like each time when a packing work is carried out.

Thus, it is possible to achieve the above-mentioned first object.

Further, according to the present invention, there is provided a method of packing catalyst characterized in that the catalyst ejector connected thereto with a hose payed off from a hose wind-up mechanism provided outside of the reaction tower, is suspended downward from an opening in the upper part of the reaction tower so as to scatter the catalyst fed through the hose into the reaction tower by the catalyst ejector, a wind-up force which is less than the weight of the catalyst ejector is effected in the hose wind-up mechanism always during scattering; the hose is wound up onto the hose wind-up mechanism with the use of the wind-up force during ascent of the catalyst ejector; and the hose is payed off from the hose wind-up mechanism with the use of the weight of the catalyst ejector, overcoming the wind-up force during descent of the catalyst ejector.

Further according to the present invention, there is provided a catalyst packing apparatus characterized by a catalyst ejector for scattering the catalyst in the reaction tower being suspended from an opening in the upper part of the reaction tower, a hose is connected to the catalyst ejector and is led into the reaction tower from the outside thereof through the opening, and a hose wind-up mechanism which can wind up the hose with a wind-up force less than the weight of the catalyst ejector, and which can be operated in a reverse direction overcoming the wind-up force when a wind-up operation is effected.

With these arrangements, a predetermined wind-up force is always applied to the hose extending to the catalyst ejector by the hose wind-up mechanism so as to automatically pay off or wind up the hose in association with ascent and descent of the catalyst ejector, thereby it is possible to prevent the hose from slacking in the intermediate part thereof and to eliminate the necessity of having a complicated control. Thus, it is possible to achieve the above-mentioned second object.

Further, according to the present invention, there is provided a method of packing catalyst characterized in that a noncontact type distance sensor is supported to the catalyst ejector suspended in the reaction tower for scattering the catalyst in the reaction tower, the distance sensor being adapted to scan the outer surface of the catalyst bed scattered in the reaction tower after completion of a scattering of the catalyst by the catalyst ejector in order to check the configuration of the outer surface of the catalyst bed in view of distances to the outer surface delivered from the distance sensor.

Further, according to the present invention, it is characterized in that the distance from the distance sensor to the outer surface of the catalyst bed directly therebelow is measured while the distance sensor is shifted in a substantially horizontal direction during scanning by said sensor.

With these arrangements, the outer surface of the catalyst bed is scanned by the distance sensor supported on the catalyst ejector suspended in the reaction tower so that the configuration of the outer surface can be surely checked from the outside of the reaction tower, thereby it is possible to achieve the third object.

It is noted that the distance sensor is fixed in the vicinity of the front end of a hold means for holding the catalyst ejector at the center of the reaction tower, which radially extend and retract from the catalyst ejector and which can make contact at its front end with the inner surface of the reaction tower, and the distance sensor is moved by extending and retracting the holding means so as to scan the outer surface of the catalyst bed in order to check the configuration thereof.

It is preferable to use, as a device for carrying out the above-mentioned scanning, a device having a noncontact type distance sensor which is supported on the catalyst ejector suspended in the reaction tower for scattering the catalyst, and which can scan the outer surface of the catalyst bed therebelow, and a process means for controlling the scanning of the distance sensor and for checking the configuration of the outer surface in view of distances to the outer surface which are delivered from the distance sensor.

Further, in this device, the distance sensor can measure a distance to the outer surface of the catalyst bed directly therebelow, and is preferably supported in the vicinity of the front end of the holding means which can radially extend and retract from the catalyst ejector and which can make contact at its front end with the inner surface of the reaction tower.

DETAILED DESCRIPTION OF THE PREFERRED EMBODIMENT(S)

The present invention will be hereinbelow detailed in the form of an embodiment with reference to the drawings.

Figure 1:
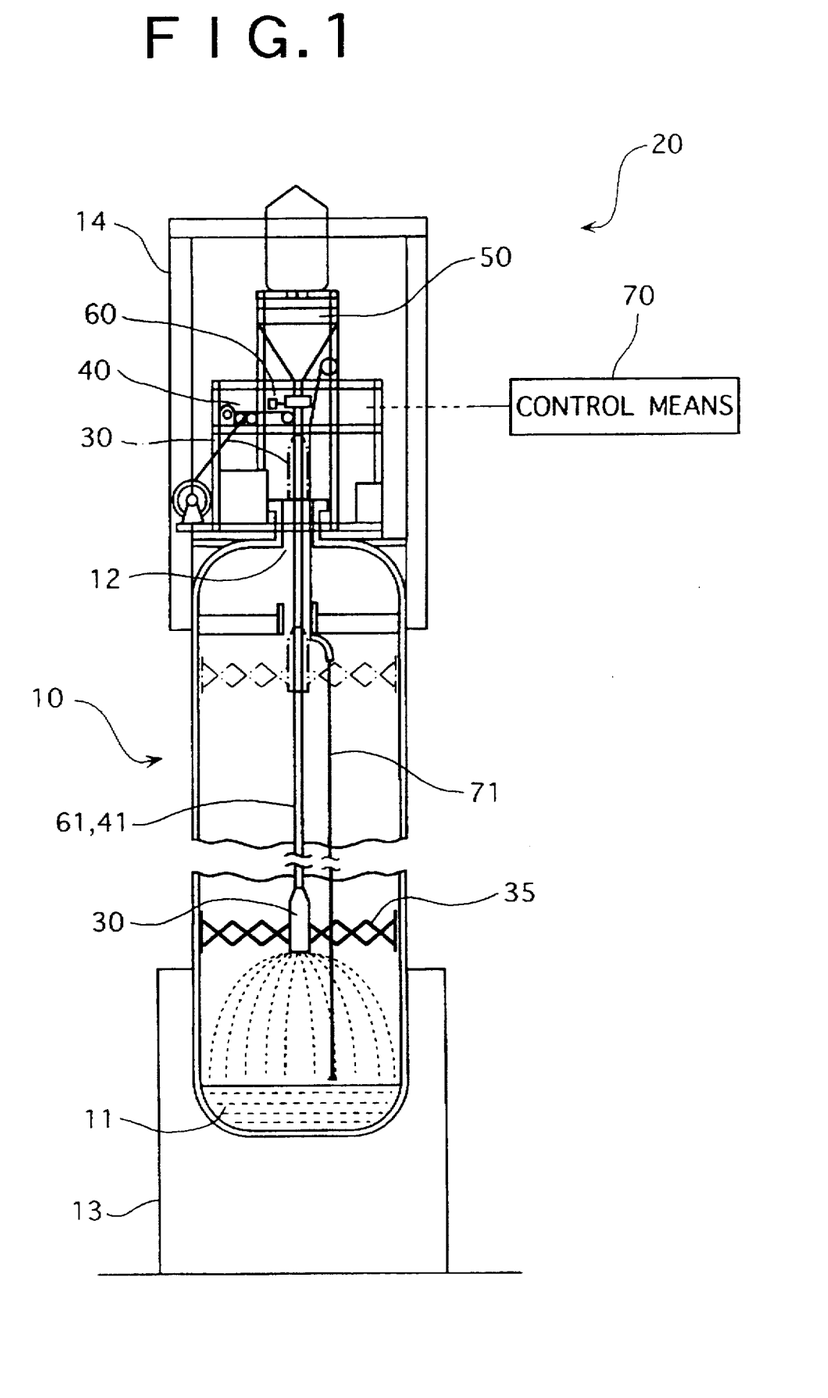
FIG. 1 is a side view illustrating the entire arrangement of an embodiment of the present invention.

Referring to FIG. 1, a reaction tower 10 has a large bottomed, cylindrical shape, in which catalyst is packed, and is formed in its top-surface at the center of the latter with an opening 12 and is secured and supported at its bottom on a base 13.

A frame 14 is incorporated in the upper part of the reaction tower 10, and a catalyst packing apparatus 20 which is essential in the present invention is arranged in the frame 14.

The catalyst packing apparatus 20 has a catalyst ejector 30 which is introduced and suspended in the reaction tower 10 for scattering catalyst in rotation, a chain wind-up mechanism 40 for winding up a chain 41 which suspends the catalyst ejector 30 so as to move the latter up and down, a hopper mechanism 50 for supplying the catalyst to be scattered, and a hose wind-up mechanism 60 for winding up a hose 61 through which the catalyst is supplied to the catalyst ejector 30 from the hopper mechanism 50.

Further, the catalyst packing apparatus 20 incorporates a control means 70 for controlling the entire operation in accordance with outputs from various sensors including a wire-like level meter 71 for detecting the height of the outer surface of the catalyst bed packed in the reaction tower 10.

The catalyst ejector 30 is adapted to scatter in rotation the catalyst which is supplied through the hose 61, from an ejector plate 31 (FIG. 6) which is rotated in the lower part of the catalyst ejector 30. It is preferable to use, as the catalyst ejector 30, a device which can scatter the catalyst in a multiple concentric circle-like pattern radially from several positions, as is disclosed in Japanese Patent Application No. 63-165577 belonging to the applicant.

Further, the catalyst ejector 30 incorporates three holding arms 35 which radially extend for holding the center of the catalyst ejector 30 at the center of the reaction tower 10. Each of the holding arms 35 has a pantograph type expansion mechanism and has its front end part 84 (FIG. 6) which can abut against the inner wall of the reaction tower 10 and which carries a roller so as to be vertically rollable, and accordingly, the catalyst ejector 30 can be held at the center of the reaction tower 10 by the extended holding arms 35 and is freely elevatable in this condition.

Figure 6:
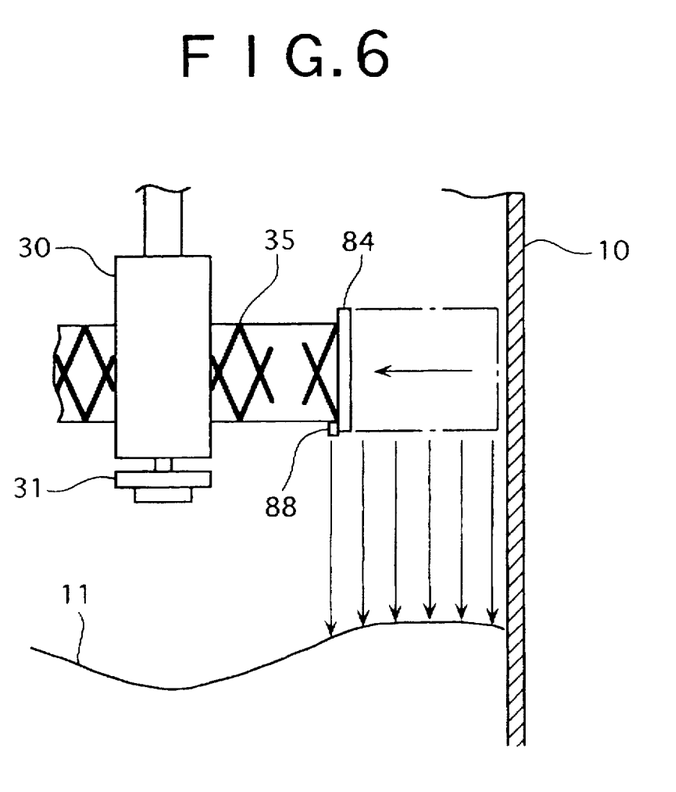
FIG. 6 is a cross-sectional view illustrating the inspection for the configuration of the outer surface of catalyst bed in the embodiment shown in FIG. 1.

As shown in FIG. 6, a distance sensor 88 which is supported to the front end of each holding arm 35, is adapted to scan the outer surface of the catalyst bed 11 in the reaction tower 10 by extension and retraction of the holding arm 35, and accordingly, the control means 70 shown in FIG. 1 can measure the configuration of the outer surface of the scattered catalyst bed.

Thus, in this embodiment, the configuration of the outer surface of the catalyst bed packed in the reaction tower 10 can be surely checked from the outside of the reaction tower 10 in such a condition that the catalyst ejector 30 is left in the reaction tower 10.

Figure 4:
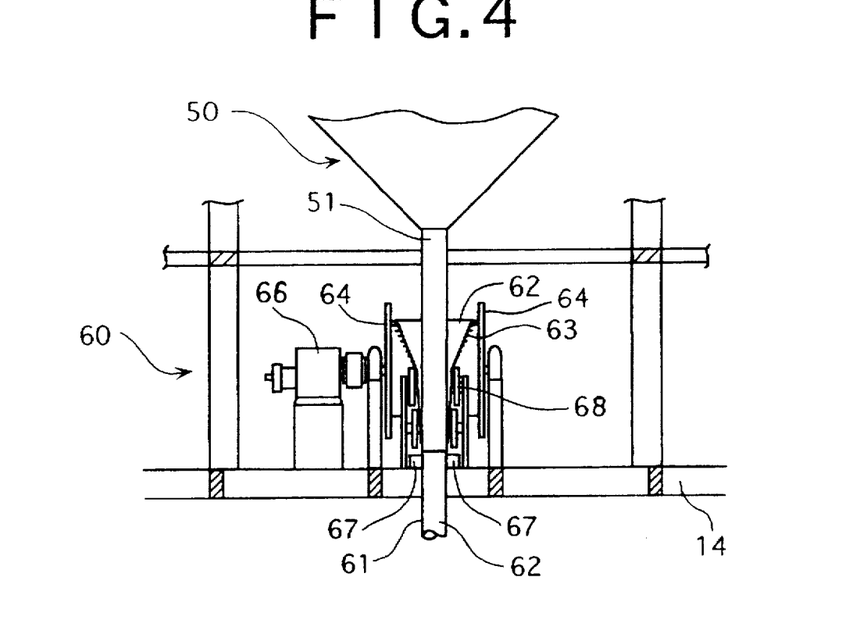
FIG. 4 is a front sectional view illustrating a hose wind-up mechanism in the embodiment shown in FIG. 1.
Figure 5:
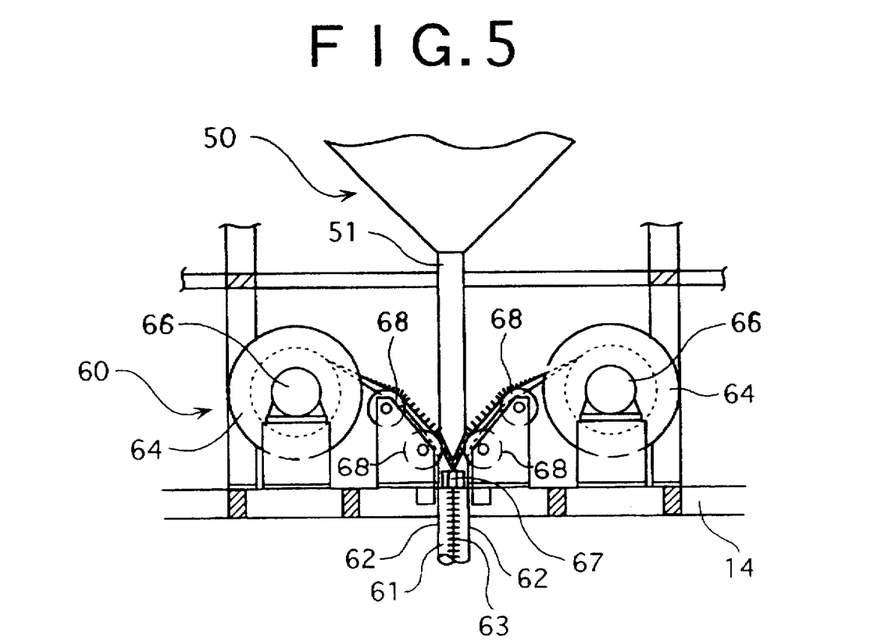
FIG. 5 is a side sectional view illustrating the hose wind-up mechanism in the embodiment shown in FIG. 1.

As shown in FIGS. 4 and 5, the hose wind-up mechanism 60 is adapted to use the hose 61 formed of a pair of belt members 62 which are joined at opposite sides by fasteners 63 so as to have a pipe-like shape, and has a pair of reels 64 which wound thereon with the belt members 62, respectively, a pair of air motors 66 which drive the reels 64, respectively, under the control of the control means 70, rollers 68 in pairs for guiding the belt members 62 payed out from the reels 64 so as to lead them along a pipe 51 extending from the hopper mechanism 50, joint members 67 for fastening and unfastening the fasteners 63 at both sides of the belt members 62 which are opposed together in a curved condition along the pipe 51.

Each of the belt members 62 is an anti-static type conveyer belt or the like, and existing fasteners made of plastic or the like can be used as the fasteners 63.

The joint members 67 correspond to worms on fasteners usually available, and fixed to the frame 14. Accordingly, the fasteners 63 are fastened when they run downward through the joint members 67, but are unfastened when they runs upward through the joint members 67 before they are wound onto the reels 64.

Each of the air motors 66 is any of the conventional devices which generates a force when compressed air is fed thereinto from the outside thereof. If compressed air at a predetermined pressure is continuously fed to the air motor under the control of the control means 70, a desired rotating drive power can be maintained. Even in such a condition that this drive power is held, the motor can be reversed if the load thereof increases.

Accordingly, upon descent of the catalyst ejector 30, the hose 61 is automatically payed out by the weight of the catalyst ejector 30, overcoming the drive power of the air motors, and upon ascent of the catalyst ejector 30, an extra length of the hose 61 is automatically wound up by the drive power of the air motors 66.

The control means 70 controls the catalyst ejector 30 and the chain wind-up mechanism 40 in accordance with instructions and packing terms inputted from the outside, and the like, and accordingly, the introduction and extraction of the catalyst ejector 30 into and from the reaction tower 10, and the work for packing the catalyst are carried out in a desired condition.

Figure 2:
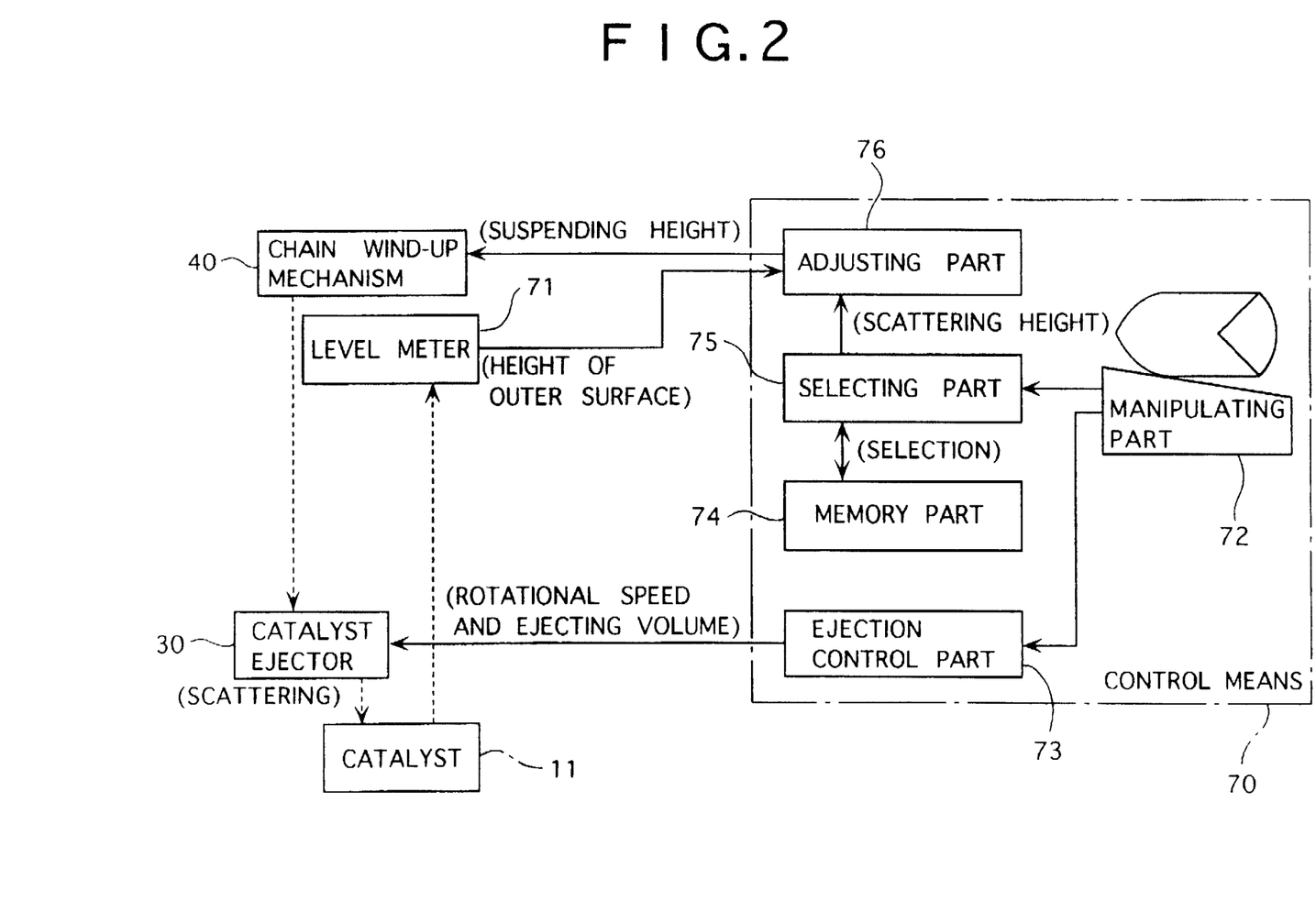
FIG. 2 is a block diagram illustrating a control means in the embodiment shown in FIG. 1.

Accordingly, as shown in FIG. 2, the control means 70 has a manipulation part 72 including an input keyboard for inputting the terms for packing the catalyst and the like, and a display for several indications, an ejection control part 73 for controlling the volume of the catalyst ejected from the catalyst ejector 30, and the rotational speed upon ejection of the catalyst in accordance with a set term set on the manipulation part 72, and a memory part 74, a selecting part 75 and an adjusting part 76 which control the chain wind-up mechanism 40 so as to adjust the suspension height of the catalyst ejector 30 in accordance with a set condition on the manipulation part 72. The memory part 74 stores therein correlated data exhibiting the relationship between the scattering height of the catalyst and the packing density, as shown FIG. 3.

Figure 3:
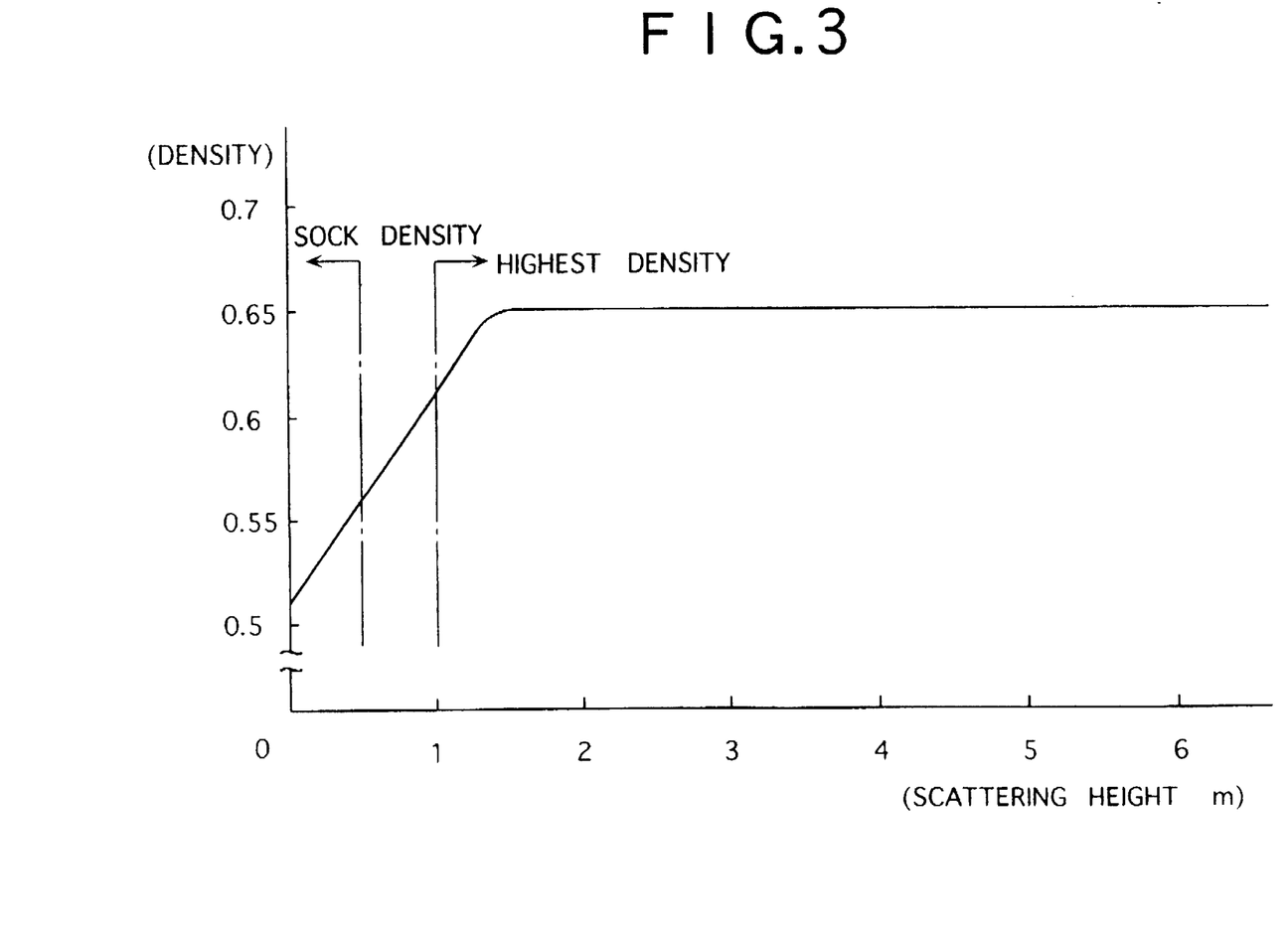
FIG. 3 is a graph showing correlation data used in the embodiment shown in FIG. 1.

The correlated data are those which have been actually measured during a trial work which has been separately carried out beforehand. That is, the correlated data can be obtained by measuring variation in the packed density of catalyst bed in such a condition that a kind, a particle size and a specific weight of the catalyst, a scattering volume per unit time, and the rotational speed of the catalyst ejector are set to predetermined terms, respectively, and are stored in the form of an approximated arithmetic function, a data table or the like from which a scattering height corresponding to an inputted arbitrary packed density can be obtained.

It is noted that from the correlated data shown in FIG. 3, such a fact is found that the packed density of the catalyst bed becomes highest in a range above a scattering height of 1 m, and even at a height higher than 1.5 m, the packed density becomes constant without exceeding 0.65. Meanwhile, in a range below a scanning height of 0.5 m, it exhibits a sock packed density, and in each of ranges between these ranges, a condition intermediate between the highest packed density and sock packed density is exhibited.

The selecting part 75 is adapted to select a scattering height corresponding to a packed density which has been designated in accordance with a set term inputted through the manipulation part 72, from the memory part 74.

The adjusting part 76 adjusts the scattering height for the catalyst scattered from the catalyst ejector 30 in accordance with the scattering height selected by the selecting part 75, that is, the height of the outer surface of the catalyst bed in the reaction tower 10 is measured by the level meter 71, and a suspension height of the catalyst ejector 30 is computed by adding the above-mentioned scattering height to the height of the outer surface. Further, the chain wind-up mechanism 40 is controlled so as set the suspension height to the thus computed value.

It is noted that the adjusting part 76 repeats the above-mentioned control for the scattering height when the height of the outer surface of the catalyst in the reaction tower 10 becomes a predetermined height in advance of the scattering after the above-mentioned control.

In this embodiment, the catalyst scattering in the reaction tower is carried out by the following procedure.

At first, the catalyst ejector 30 is suspended in the reaction tower 10 by means of the chain wind-up mechanism 40 in such a condition that the holding arms 35 are retracted, and then the three holding arms 35 are extended in the vicinity of the bottom of the reaction tower 10 so as to hold the catalyst ejector 30 at the center of the reaction tower 10.

In this condition, the ejection control part 73 operates the catalyst ejector 30 at a predetermined rotational speed and ejection volume, and accordingly, the catalyst supplied from the hopper mechanism 50 through the hose 61 is scattered in the reaction tower 10 with a multiple concentric circle pattern.

In this phase, if a desired packed density is set on the manipulation part 72, an appropriate scattering height is automatically set by the selecting part 75 and the memory part 74, and the suspension height of the catalyst ejector 30 is adjusted by the adjusting part 76 so as to set the catalyst ejector 30 to this scattering height.

That is, if a packed density of 0.6 is required, the scattering height is set to 1 m in view of the correlated data shown in FIG. 3. Further, if a packed density of 0.65 is required, the scattering height is set to a value higher than 1.5 m. As a result, the packed density becomes highest.

Meanwhile, if a sock packed density is required, then a scattering height less than 0.5 m is set in view of the correlated data shown in FIG. 3, and as a result, a height from 0.5 m 0 m is set in accordance with a density of 0.55 to 0.5. In this case, the rotational speed and scattering volume of the catalyst ejector 30 are increased in order to absorb a decrease in the rotationally scattering range due to a decrease in the scattering height.

The outer surface of the catalyst bed 11 in the reaction tower 10 rises up in advance of the scattering, and accordingly, the adjusting part 76 detects the height of the outer surface of the catalyst bed 11 by means of the level meter 71, and raises the catalyst ejector 30 by means of the chain wind-up mechanism 40 each time when the increment of the height of the outer surface exceeds a predetermined value, thereby the scattering height is controlled so that it can be maintained at a set value.

With the repetitions of the scattering of the catalyst from a predetermined height and the adjustment to the height of the catalyst ejector 30, when the catalyst ejector 30 comes up to its ascent limit in the reaction tower 10, the rotational speed of the catalyst scattering is increased in accordance with a decrease in the scattering height due to a rise-up of the outer surface of the catalyst bed 11 so as to ensure the scattering range, and when the outer surface of the catalyst bed 11 comes up to a predetermined height, the scattering is completed.

The above-mentioned embodiment offers the following technical effects and advantages:

If a desired packed density is set, the control means 70 selects a suitable scattering height with which the, desired packed density can be obtained, and carries out the scattering operation in order to maintain the scattering height.

Accordingly, the catalyst can be packed in the reaction tower 10 with a desired packed density having been set beforehand.

The packed condition of the catalyst bed 11 can be set to be a highest packed density, a sock packed density, a packed density intermediate therebetween or the like, thereby it is possible to surely and easily obtain a desired packing result.

Meanwhile, upon the scattering, it is sufficient that the worker sets a desired packed density, a desired condition and the like through the manipulation part 72, and thereafter, the catalyst packing apparatus 20 automatically carries out the scattering under the control of the control means 70. Thus, the catalyst packing work can be easily and surely carried out, thereby it is possible to enhance the working efficiency.

In particular, since the control means 70 selects a scattering height corresponding to a set packed density from the correlated data shown in FIG. 3 which have been previously obtained by actual measurements, an appropriate scattering height can surely and rapidly set.

Accordingly, no skilled worker is required for the setting, but any one can surely and rapidly set a suitable scattering height, and it is possible to prevent erroneous discretion and manipulation or and the like.

Further, the automatic process by the catalyst packing apparatus 20 can perform the scattering work which can give one and the same packed density, at a maximum speed, thereby it is possible to further enhance the working efficiency in view of this point.

Further, since the distance sensor 88 supported to the front end of the holding arm 35 scans the outer surface of the catalyst bed 11 in the reaction tower 10 by the extension and retraction of the holding arm 35, the configuration of the outer surface of the catalyst bed 11 packed in the reaction tower 10 can be surely checked from the outside, thereby it is possible to simplify the inspection device and to enhance the working efficiency.

Further, in the hose wind-up mechanism 60, a predetermined wind-up force is always applied to the hose 61 led to the catalyst ejector 30, by the air motor 66, and accordingly, the hose 61 is paid out, overcoming the wind-up force upon descent of the catalyst ejector 30 while an extra length thereof is automatically wound up by the wind-up force upon ascent of the catalyst ejector 30, and accordingly, it is possible to prevent the intermediate part of the hose 61 from slacking and to eliminate the necessity of the manipulation for the adjustment to the length as conventionally required, thereby the wind-up and the pay-off of the hose 61 leading to the catalyst ejector 30 can be surely and easily carried out.

It should be emphasized that the present invention should not be limited only to the above-mentioned embodiment, but may include the following variant forms.

That is, the correlated data for the scattering height which gives a designated packed density, may not only be given by that shown in FIG. 3 but may be suitably determined by each of other terms such a kind and a particle size of catalyst, a rotational speed in scattering, and a scattering volume since the correlated data vary also depending upon these other terms.

The correlated data may be prepared from previous actual measurements under various kind of terms, and in addition, may be obtained from accumulation of empirical data owned by a skilled person in accordance with the other terms. Further, the correlated data can be obtained from the combination of both actual measurements and accumulation of the empirical data, and from the generalization of them.

Further, the correlated data may be stored in the control means 70 for every other term so that the corresponding data are selected every time when the other term varies.

Further, it is sufficient, as to the type of the correlated data, to suitably select those which complementarily uses a data table incorporating discrete values, or those held as approximated values or the like for every range, that is, it is sufficient to obtain a scattering height with which a desired packed density can be given.

Moreover, the correlated data my include not only the relationship between the packed density and the scattering height, but also those corresponding to a part of the other terms.

For example, if a rotational speed necessary for scattering the catalyst in a required area in the reaction tower 10 for every scattering height, is included, suitable setting can be easily and surely made in such case that a process coping with a rise-up of the outer surface of the catalyst bed 11 after the catalyst ejector 30 comes up to the upper limit is carried out by changing the rotational speed.

It is noted that the arrangements of the components of the catalyst packing apparatus 20, such as the catalyst ejector 30, the chain wind-up mechanism 40, the hopper mechanism 50, the hose wind-up mechanism 60, the control means 70 and the distance sensor 88, the types of parts used therein or the like can use existing technique, and can be suitably selected as actually required.

For example, an existing computer system or the like which has been suitably set so as to perform the above-mentioned control can be used as the control means 70.

Further, the catalyst ejector 30 should not be limited to the one having the holding arms 35, and further, the shape of the ejecting plate 31 or the like can be arbitrarily selected.

What is claimed is:

1. A catalyst packing apparatus, comprising: a catalyst ejector suspended in a reaction tower for scattering catalyst in said reaction tower to form a catalyst bed, said catalyst ejector being adjustable in its suspended height, and control means for controlling the height of said catalyst ejector, wherein said control means comprises sensing means for measuring a scattering height between said catalyst ejector and a surface of the catalyst bed in said reaction tower, a memory part for storing therein a relationship between the scattering height measured from said surface of the catalyst bed in said reaction tower to said catalyst ejector and a packed density of the catalyst bed scattered from said scattering height, a selecting part for selecting a scattering height corresponding to a designated packed density from said memory part, and an adjusting part for adjusting the height of said catalyst ejector so as to obtain said scattering height selected by said selecting part, said sensing means including at least one radially extendable holding arm and a distance sensor, said holding arm being supported from said catalyst ejector, being retractable into a first position having a free end of said holding arm adjacent said catalyst ejector and being extendable into a second position having said free end of said holding arm remote from said catalyst ejector, said distance sensor being attached to said free end of said holding arm for measuring a height from the distance sensor to said surface of said catalyst bed, and said distance sensor communicating said measured height to said control means.

2. A catalyst packing apparatus as set forth in claim 1, wherein said catalyst ejector for scattering the catalyst in said reaction tower is suspended through an opening in an upper part of said reaction tower, wherein a hose is connected to said catalyst ejector and is led into said reaction tower from the outside thereof through said opening, and wherein a hose wind-up mechanism engaging said hose is provided for effecting a wind-up force to wind up said hose, said wind-up force being less than the weight of said catalyst ejector, and said wind-up mechanism operates in a reverse direction playing out said hose overcoming said wind-up force.

3. A catalyst packing apparatus according to claim 2, further comprising a chain supporting said catalyst ejector and a chain wind-up mechanism engaging said chain to control the height of the catalyst ejector in said reaction tower in response to a control signal from said adjusting part of said control means, and wherein said hose supplies catalyst to said catalyst ejector.

4. A catalyst packing apparatus according to claim 2, wherein said hose includes a pair of belt members, said belt members each having fasteners at opposite sides thereof joinable together to form said hose into a pipe shape, and wherein said hose wind-up mechanism includes a pair of reels winding said belt members thereon and an air motor for driving said reels.

5. A catalyst packing apparatus according to claim 4, further comprising a hopper storing the catalyst therein, a pipe extending from a bottom of said hopper, and joint members positioned along said pipe for fastening said fasteners, said hose being formed into said pipe shape around said pipe.

6. A catalyst packing apparatus according to claim 1, wherein said catalyst ejector has an ejector plate rotatably connected to a lower part thereof.

7. The catalyst packing apparatus according to claim 1, wherein said holding arm having said distance sensor thereon moves said distance sensor substantially horizontally over said surface of catalyst bed in said reaction tower, and said distance sensor scans downwardly to measure said height from said distance sensor to said surface of catalyst bed in said reaction tower.

8. The catalyst packing apparatus according to claim 7, wherein said distance sensor is a noncontact sensor measuring the distance to said surface of said catalyst bed without touching said catalyst.

9. The catalyst packing apparatus according to claim 1, wherein said free end of said holding arm contacts an inner surface of said reaction tower to stabilize said catalyst ejector when said holding arm is in said second position.

10. The catalyst packing apparatus according to claim 9, wherein said at least one holding arm comprises a plurality of arms extendable outwardly from said catalyst ejector, each of said plurality of arms contacting said inner surface of said reaction tower when fully extended at said second position to stabilize said catalyst ejector.

11. The catalyst packing apparatus according to claim 10, wherein each of said plurality of arms has one said distance sensor thereon.

* * * * *